United States Patent [19]

Kumagai et al.

[11] Patent Number: 4,846,907
[45] Date of Patent: Jul. 11, 1989

[54] METHOD OF PRODUCING TIRE BELTS

[75] Inventors: Yuzo Kumagai; Yasutoshi Aoki, both of Tokyo, Japan

[73] Assignee: Bridgestone Corporation, Tokyo, Japan

[21] Appl. No.: 208,539

[22] Filed: Jun. 20, 1988

[30] Foreign Application Priority Data

Jun. 26, 1987 [JP] Japan .................. 62-159295

[51] Int. Cl.$^4$ .......................................... B29D 30/20
[52] U.S. Cl. ................................. 156/130; 156/421.4
[58] Field of Search ................. 156/130, 132, 421.4, 156/416

[56] References Cited

U.S. PATENT DOCUMENTS

| | | | |
|---|---|---|---|
| 2,045,545 | 6/1936 | Shook | 156/421.4 X |
| 3,971,694 | 7/1976 | Gazuit | 156/416 X |
| 4,427,473 | 1/1984 | Shichman et al. | 156/130 |
| 4,482,416 | 11/1984 | Yasukochi et al. | 156/133 |
| 4,602,972 | 7/1986 | Goodfellow | 156/111 |

FOREIGN PATENT DOCUMENTS

| | | |
|---|---|---|
| 33-119846 | 7/1958 | Japan . |
| 51-5379 | 1/1976 | Japan . |
| 51-13874 | 2/1976 | Japan . |
| 53-18682 | 2/1978 | Japan . |
| 57-98342 | 6/1982 | Japan .................. 156/130 |

Primary Examiner—Raymond Hoch
Attorney, Agent, or Firm—Sughrue, Mion, Zinn, Macpeak & Seas

[57] ABSTRACT

A method of producing tire belt comprises a first step of attaching a first belt ply to a forming drum having, at its axial ends, curved portions whose diameters reduce progressively toward axially outer ends of the curved portions. The first belt ply has a width wider than an axial length of the forming drum. The method further comprises a second step of expanding the forming drum so that diameters of the curved portions at axially outermost ends become a predetermined diameter smaller than a maximum diameter of the forming drum in the first step to deform a central portion of the first belt ply following to an outer contour of the forming drum, a third step of foldering ends of the first belt ply at axial outer ends of a second belt ply after attaching the second belt ply to a center portion of the first belt ply outwardly thereof, and a fourth step of attaching a third belt ply in plural layers onto the first and second belt plies outwardly thereof.

6 Claims, 6 Drawing Sheets

FIG_1a
PRIOR ART

FIG_1b
PRIOR ART

FIG_2a
PRIOR ART

FIG_2b
PRIOR ART

FIG_2c
PRIOR ART

FIG_6

FIG_7a

FIG_7b

FIG_7c

FIG_7d

METHOD OF PRODUCING TIRE BELTS

BACKGROUND OF THE INVENTION

This invention relates to a method of producing belts for use in high speed heavy-duty radial tires.

In general, belts for constituting high speed heavy duty tires, for example, tires for aircraft extend beyond shoulders of the tires in order to prevent standing waves and the like. If such belts are formed into cylindrical shapes by means of cylindrical forming drums in the conventional manner, ends of the belts in width directions of the tires are pushed radially inwardly by inner surfaces of vulcanizing molds in vulcanization to cause slacks and wrinkles thereat. In order to avoid this, midways of the belts in the width directions are radially outwardly expanded relatively to the ends of the belts to cause configurations of the belt to follow inner surfaces of the vulcanizing molds as much as possible.

Figure 1A:
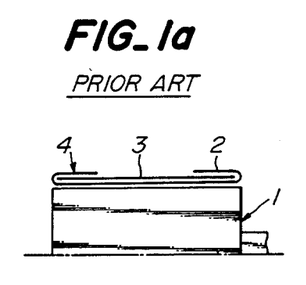
FIGS. 1a and 1b are schematic explanatory views illustrating one example of method of producing a belt for a tire according to the prior art.
Figure 1B:
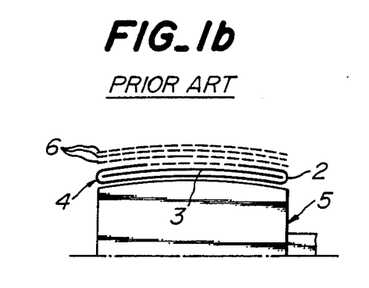

In producing the belts in this manner, for example, as shown in FIGS. 1a and 1b, a first wide belt ply 2 and a second narrow belt ply 3 are applied onto a cylindrical forming drum 1 one after another during centering of these plies 2 and 3. Thereafter, ends of the first belt ply 2 in width directions are folded to form a lamination 4 and then the lamination 4 is transferred from the forming drum 1 to a forming drum 5 having larger diameters at a mid portion than diameters at ends in axial directions. Then, diameters of the forming drum 5 are enlarged to expand in radial directions the substantially mid portion of the lamination 4 in axial directions. Third belt plies 6 in layers are then attached on the lamination 4. In such a method, however, shearing forces would occur between the first and second belt plies 2 and 3 in width directions of tread during the deformation of the lamination 4. Therefore, these belts do not precisely deform following the outer circumference of the forming drum 5. Moreover, even if the desired deformation is carried out, there is a risk of reinforcing cords and rubber being separated. During forming, furthermore, the lamination 4 must be transferred from the forming drum 1 to the forming drum 5. The transfer of the lamination 4 from drum 1 to drum 5 lowers the working efficiency and makes difficult the centering of the lamination 4 relative to the forming drum 5.

Figure 2A:
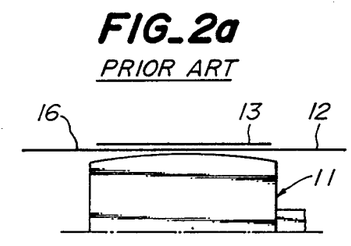
FIGS. 2a, 2b and 2c are schematic explanatory views illustrating another example of method of producing a belt for a tire according to the prior art.
Figure 2B:
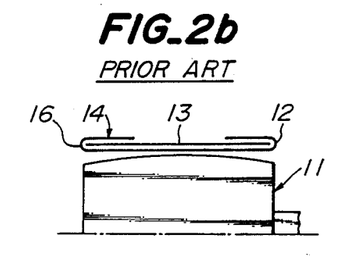
Figure 2C:
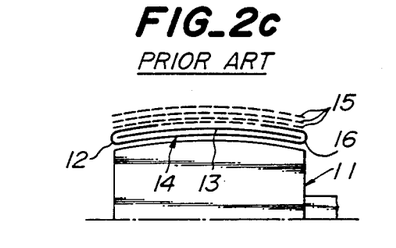

In order to solve these problems, the following method will be considered. First and second belt plies 12 and 13 are attached to a forming drum 11 similar to the forming drum 5 above described, while centering the belt plies 12 and 13. Thereafter, ends of the first belt ply 12 are folded to form a lamination 14. Third belt plies 15 in layers are then attached onto the lamination 14, while the belt plies 15 are being subjected to tensile forces, so that the lamination 14 is deformed to follow the outer circumference of the forming drum 11.

In such a manufacturing method of belts, however, when the first belt ply 12 is folded, there are slight clearances between folded positions 16 of the first belt ply 12 and the forming drum 11. Therefore, the first belt ply 12 is not restrained at the folded portions 16. Thus the first belt ply 12 is likely to be folded at positions out of the predetermined folded positions 16. Moreover, at the commencement of application of the third belt plies 15, the lamination 14 is scarcely restrained by the forming drum 11 so that the lamination 14 is deformed by attaching the third belt plies 15 onto the lamination 14. As a result, the third belt plies 15 tend to be unintentionally shifted and tend to be attached to the lamination 14 out of the desired positions.

SUMMARY OF THE INVENTION

It is an object of the invention to provide a method of producing belts for tires, which eliminates all the disadvantages of the prior art and which enables a belt ply to be folded at correct positions and belt plies to be attached at desired relative positions.

In order to achieve this object, the method of producing tire belts according to the invention comprises a first step of attaching a first belt ply to a forming drum having, at least at its axial ends, curved portions whose diameters reduce progressively toward axially outer ends of the curved portions, said first belt ply having a width wider than an axial width of the forming drum, a second step of expanding said forming drum so that diameters of said curved portions at axially outermost ends become a predetermined diameter smaller than a maximum diameter of the forming drum in said first step to deform the non overhanging portion of said first belt ply to conform to the outer surface contour of said forming drum, a third step of folding the overhanging ends of the first belt ply at outer ends of a second belt ply in width directions after attaching the second belt ply to a center portion of the first belt ply outwardly thereof, and a fourth step of attaching a third belt ply in plural layers onto said first and second belt plies outwardly thereof.

According to the invention, the first belt ply is attached to the forming drum in the first step. As the width of the first belt ply is wider than the axial length of the forming drum, the ends of the first belt ply in width directions extend beyond the axial ends of the forming drum. Then, the forming drum is expanded so that the center portion of the first belt ply is deformed following to the outer contour of the forming drum and in surface contact with the forming drum. The enlargement of diameters of the forming drum is effected within a range such that diameters of the curved portions at axially outermost ends become a diameter smaller than the maximum diameter of the forming drum in the first step. The reason is that if the diameters of the curved portions are larger than the maximum diameter, clearances would occur between the first belt ply and the forming drum in the same manner in the prior art. The second belt ply is then attached to the center portion of the first belt ply outwardly thereof. As the second belt ply is attached to the first belt ply already deformed to the desired configuration, it is not necessary to deform both the belt plies thereafter. As a result, there is no shearing force between both the belt plies. Then, both ends of the first belt plies extending beyond the forming drum in width directions are folded at outer ends of the second belt ply in width directions. As the first belt ply is embraced and restrained by the forming drum and the second belt ply between the portions to be folded, the first belt ply is precisely folded at set positions. Then, the third belt ply in plural layers is attached to the first and second belt ply to produce a belt for a tire. The third belt ply is precisely attached at set positions because of the first and second belt plies being supported by the forming drum from inside hereof.

The invention will be more fully understood by referring to the following detailed specification and claims taken in connection with the appended drawings.

DESCRIPTION OF THE PREFERRED EMBODIMENTS

Figure 3:
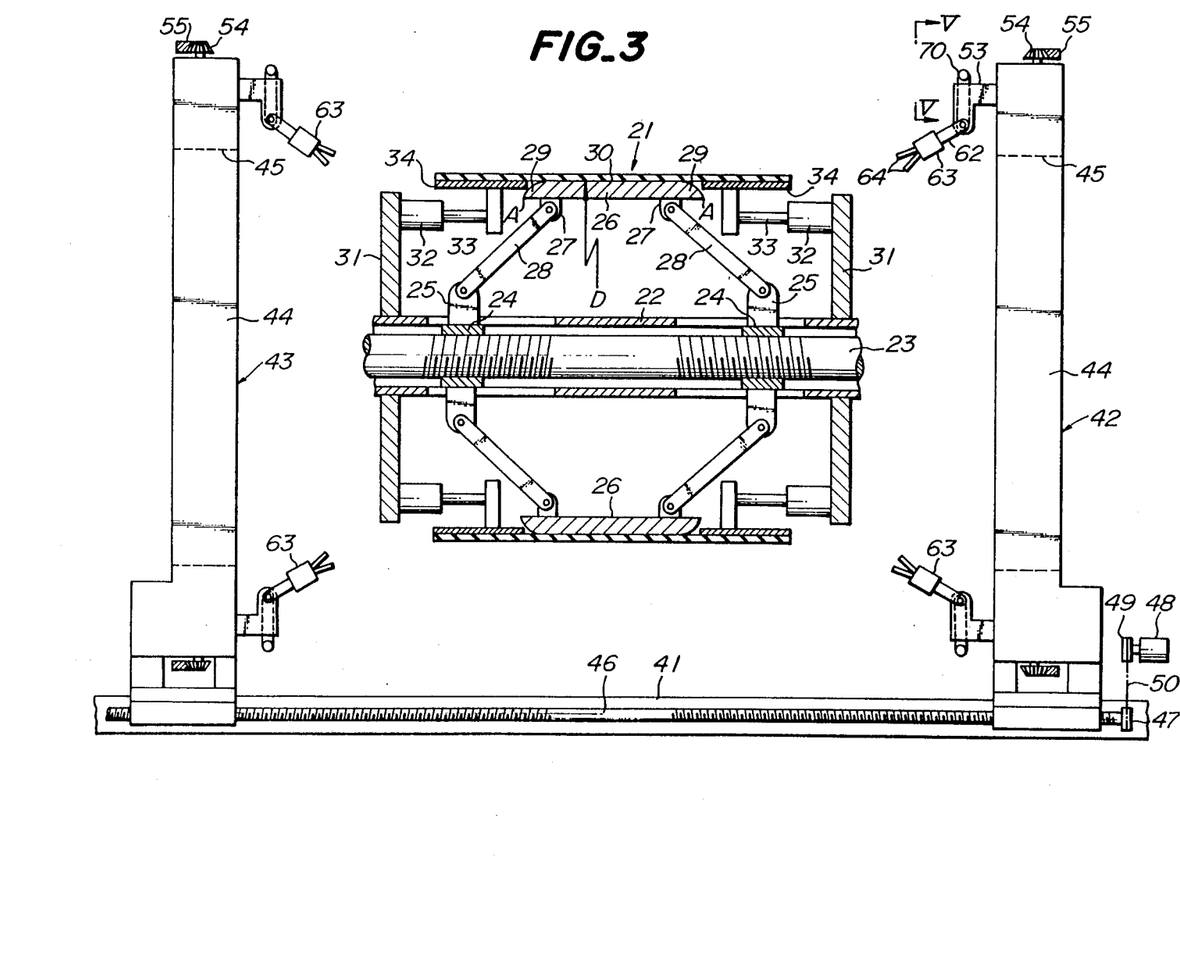
FIG. 3 is an apparatus for carrying out the invention according to the invention.

Referring to FIG. 3, reference numeral 21 illustrates a forming drum which is rotatable and whose diameter is expansible and contractible. The forming drum 21 has a horizontal hollow drive shaft 22 rotatively driven by a motor (not shown). The drive shaft 22 includes therein a screw shaft 23 formed on its two portions with screw threads turned in opposite directions and rotated together with the drive shaft 22 in unison. The screw shaft 23 is rotatively driven by a separate motor (not shown) independently from the drive shaft 22. A pair of annular nuts 24 are threadedly engaged on the screw threads of the screw shaft 23, respectively. On each of the annular nuts 24 are mounted a plurality of brackets spaced apart from each other circumferentially of the annular nut 24. There are provided a plurality of drum segments 26 having arcuate cross-sections. A pair of brackets 27 are fixed to an inner surface of each of the drum segments 26. Each of the brackets 25 is correspondingly connected to each of the brackets 27 by a link 28 whose both ends are pivotally connected to the bracket 25 and bracket 27. Therefore, the plurality of drum segments 26 form a cylindrical body. When the screw shaft 23 is rotated to move the annular nuts 24 toward and away from each other and the links 28 are rocked, the drum segments 26 are moved radially outwardly or inwardly so that the forming drum 21 expands or contracts. Each of the drum segments 26 has at its axial ends curved portions 29 decreasing diameters axially outwardly. The outer circumference of the curved portion 29 is curved in a plane including an axis of the forming drum 21 as shown in FIG. 3. The drum segments 26 have constant outer diameters between these curved portions 29 to form flat portions 30 whose diameters are the maximum among diameters of the forming drum 21. In this embodiment, the curved portions 29 are limited to ends of the drum segments 26. However, the curved portions 29 may be wider to an extent such that the curved portions extend to centers of the drum segments 26.

The drive shaft 22, the screw shaft 23, the drum segments 26 and the links 28 as above described form the forming drum 21 as a whole. Disklike brackets 31 are fixed to the drive shaft 22 axially outward of the drum segments 26. Cylinders 32 are fixed to the brackets 31 on inner sides thereof. Ring members 34 are fixed to rod ends of piston rods 33 of the cylinders 32. An outer diameter of the ring member 34 is substantially equal to the outer diameter of the forming drum 21 under an intermediate diameter condition.

Figure 4:
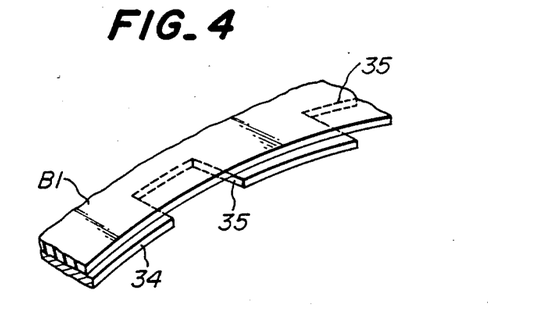
FIG. 4 is a partial perspective view illustrating ring members of the apparatus shown in FIG. 3.

The ring members 34 are formed in axially outward ends with a plurality of square or rectangular notches 35 circumferentially spaced (FIG. 4).

Guide rails 41 are arranged in parallel with the drive shaft 22 below the forming drum 21. On the guide rails 41 are slidably supported folding mechanisms 42 and 43 arranged on both sides of the forming drum 21. Each of the mechanisms 42 and 43 comprises a frame 44 which is formed with a cavity 45 in order to prevent the frame 44 from interfering with the forming drum 21 when the frame 44 becomes to the position overlapping with the forming drum 21. A screw shaft 46 is formed on its right and left portions with screw threads turned in opposite directions which are threadedly engaged in the frames 44, respectively. A pulley 47 is fixed to the screw shaft 46 and a pulley 49 is fixed to an output shaft of a motor 48. A timing belt or cog belt 50 extends about the pulleys 47 and 49. With this arrangement, when the motor 48 is energized to rotate the screw shaft 46, the folding mechanisms 42 and 43 are moved at an equal speed toward or away from each other.

Figure 5:
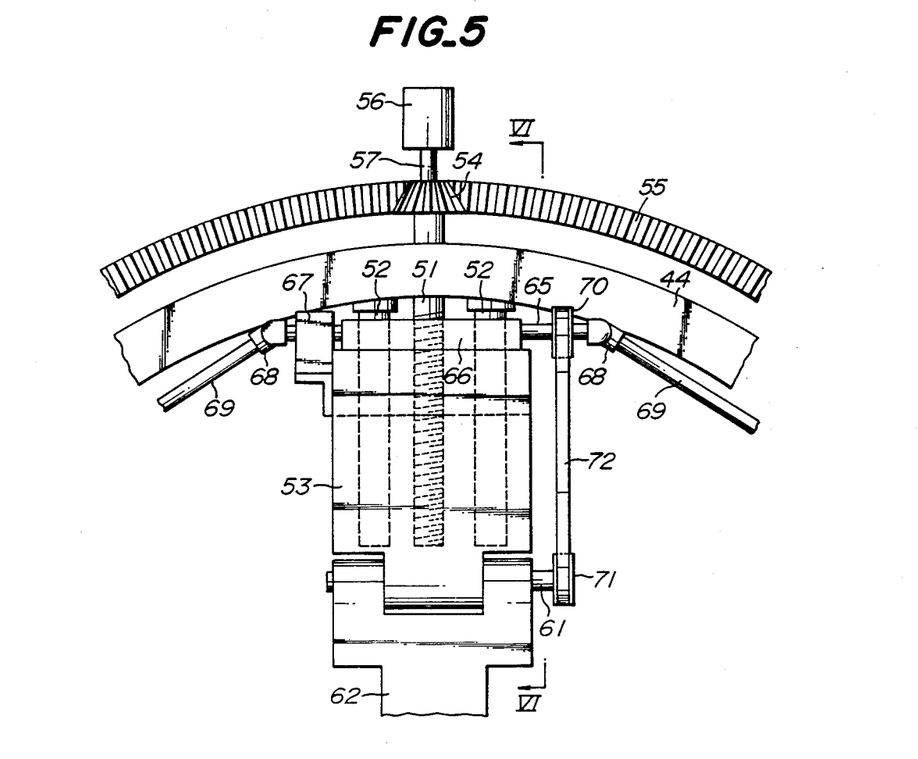
FIG. 5 is a sectional view taken along a line V—V in FIG. 3.
Figure 6:
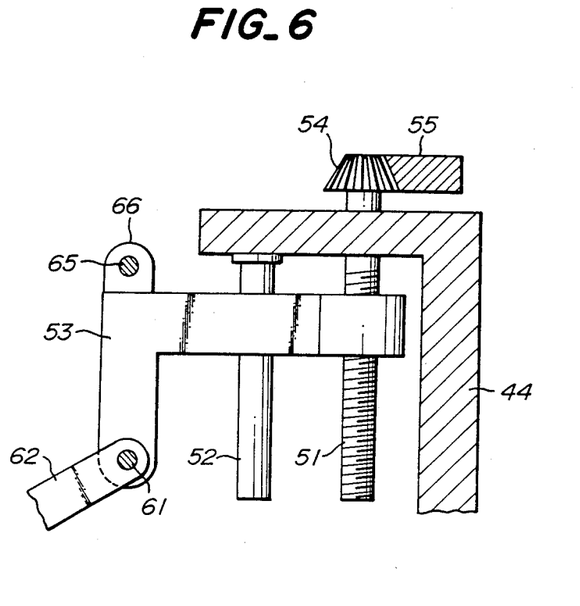
FIG. 6 is a sectional view taken along a line VI—VI in FIG. 5.

As shown in FIGS. 3, 5 and 6, a plurality of screw shafts 51 are screwed into the frames 44 of the folding mechanisms 42 and 43 so that the screw shafts 51 extend radially of the frames 44 and equally spaced circumferentially of the frames 44. A pair of guide shafts 52 are fixed in parallel with the screw shaft 51 to an inner surface of each of the frames 44 in the proximity of each of the screw shafts 51. The screw shaft 51 is screwed into each of movable blocks 53 and the guide shafts 52 are inserted into the block. To an outer end of each of the screw shafts 51 is fixed a bevel gear 54 which is in mesh with an annular rack 55 supported by the frame 44. Reference numeral 56 denotes a motor whose output shaft 57 is connected to any one of screw shafts 51. When the motor 56 is energized to rotate the screw shaft 51, the annular rack 55 is rotated through the bevel gear 54 with the result that all the bevel gears 54 and the screw shafts 51 are rotated at the same speed in synchronism with each other. As a result, all the movable blocks 53 are moved radially in synchronism with each other.

Each of the movable block 53 rotatably supports a pivotal shaft 61 to which is fixed a bottom end of an arm 62. To an outer end of the arm 62 is fixed a hand 63 comprising a pair of fingers adapted to be closed and opened for grasping a first belt ply as described later.

On the other hand, to each of the movable blocks 53 is fixed a bearing 66 supporting each of rotating shafts 65. A motor 67 is mounted onto any one of the movable blocks 53. The rotating shafts 65 are connected to each other through universal couplings 68 and connecting rods 69 so that the motor 67 is energized to rotate all the rotating shafts 65 at the same speed in synchronism with each other. A pulley 70 is fixed to each of the rotating shafts 65 and a pulley 71 is fixed to each of the rotating shafts 61. A timing belt or cog belt 72 extends about the pulleys 70 and 71. As a result, when the rotating shaft 65 is rotated, the arm 62 is swung about the rotating shaft 61.

The operation of one embodiment of the invention will be explained hereinafter.

In a first step of the method according to the invention, the forming drum 21 is maintained to have intermediate diameters substantially the same as diameters of the ring members 34 as shown in FIG. 3. While the forming drum 21 is being rotated, a first belt ply B1 having a width wider than axial lengths of the drum segments 26 is supplied to the forming drum 21 so as to be attached onto an outside of the forming drum 21 over it one full circumference. In this case, as a mid portion of the first belt ply B1 is in surface contact with flat portions 30 of the drum segments 26 having wide areas, centering of the forming drum 21 and the first belt ply B1 is securely effected. On the other hand, both the ends of the first belt ply B1 in width directions or axial directions extend beyond the forming drum 21. However, the overhanging portions of the first belt ply B1 are supported from inside by the ring members 34. Therefore, the first belt ply B1 remains cylindrical as a whole having an inner diameter substantially the same as the outer diameters of the flat portions 30 (corresponding to the maximum diameter of the forming drum under the intermediate condition). In this case, the first belt ply B1 is reinforced, for example, by nylon cords inclined at a predetermined angle relative to circumferential directions.

Figure 7A:
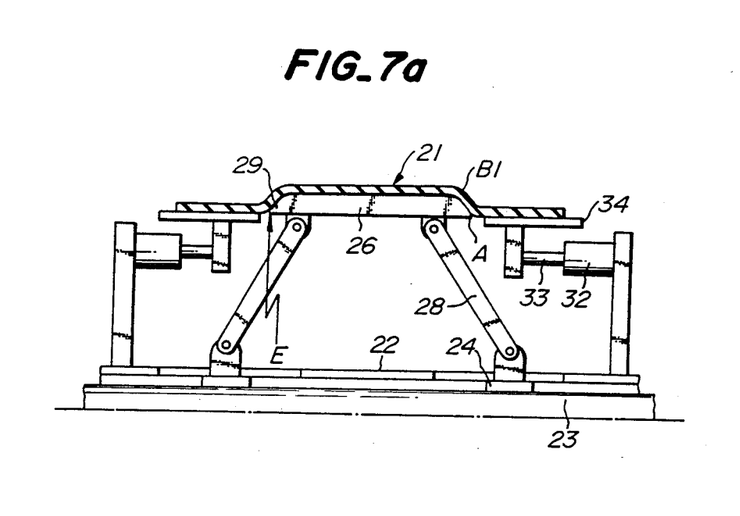
FIGS. 7a–7d are explanatory views for operations of the method according to the invention.
Figure 7B:
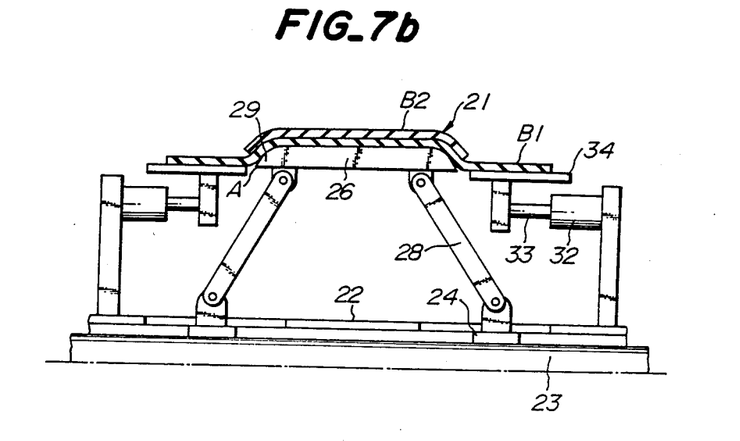

In a second step, the piston rods 33 of the cylinders 32 are retracted in synchronism with each other to move the ring members 34 axially outwardly to positions where the members 34 do not interfere with the drum segments 26 as shown in FIG. 7a. Thereafter, the screw shaft 23 is rotated to move the annular nuts 24 away from each other. As a result, the links 28 rocks outwardly to move the drum segments 26 radially outwardly in synchronism with each other so that the forming drum 21 expands to the maximum diameter. The rotation of the screw shaft 23 is stopped when outer diameters of the curved portions 29 at its outermost positions A reach a predetermined diameter E which is the same as outer diameters D of the flat portions 30 corresponding to the maximum diameter of the forming drum. In this manner, the mid portion of the first belt ply B1 is expanded radially outwardly so as to be deformed following the outer contour of the forming drum 21. As a result, the mid portion of the first belt ply B1 expands radially outwardly beyond both the ends of the first belt ply B1. The first belt ply B1 is in surface contact with the curved portions 29 as well as with the flat portions 30 of the forming drum 21. Therefore, the first belt ply B1 is further securely restrained from inside by the curved portions 29.

In this embodiment, the forming drum 21 has been expanded to the maximum diameter in order to fold the first belt ply B1 at locations in the proximity of the outermost positions A. If the first belt ply B1 is to be folded midway on the curved portions 29, the rotation of the screw shaft 23 is stopped when the diameters of the curved portions 29 at the outermost positions A become a predetermined diameter smaller than the outer diameters D.

In a third step, while the forming drum 21 is being rotated, a second belt ply B2 is supplied to the forming drum 21 so that the second belt ply 2 is attached onto the central portion of the first belt ply B1 while centering the second belt ply B2 relative to the first belt ply B1. In this case, a width of the second belt ply B2 is substantially equal to the axial lengths of the drum segments 26. As a result, both ends of the second belt ply B2 in width directions or axial directions are located in the proximity of the outermost positions A of the curved portions. Therefore, the first belt ply B1 is securely restrained in the center portion inwardly of the outermost positions A by the forming drum 21 from radial inside and by the second belt ply B2 from radial outside. The second belt ply B2 is also reinforced in the similar manner to the first belt ply B1 by inclined nylon cords whose inclined directions are opposite to the inclined directions of the first belt ply B1.

Figure 7C:
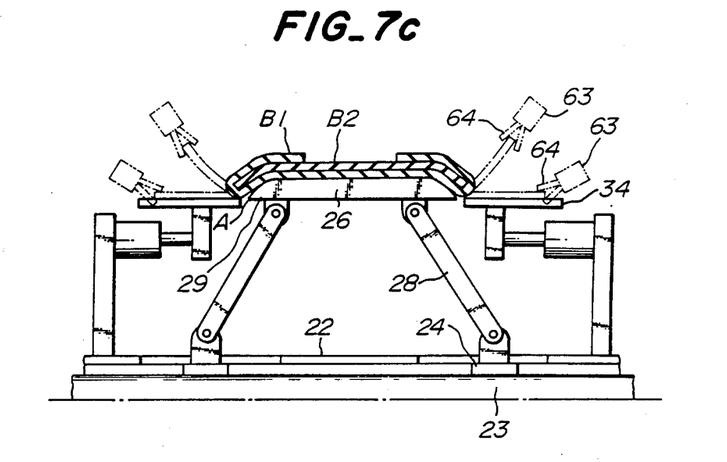

The motor 48 is then energized to rotate the screw shaft 46 to move the folding mechanisms 42 and 43 toward the forming drum 21. When the fingers 64 of the folding mechanisms 42 and 43 enter the notches 35 of the ring members 34, the hands 63 of the folding mechanisms 42 and 43 are actuated to close the fingers 64 to grasp the axial ends of the first belt ply B1 at circumferentially spaced plural positions as shown in phantom lines in FIG. 7c. Thereafter, the motors 48, 56 and 67 are energized to move the folding mechanisms 42 and 43 toward the center of the forming drum 21, to move the movable blocks 53 radially and to rock the arms 62. As a result, the fingers 64 grasping the ends of the first belt ply B1 are moved as shown in FIG. 7c to fold the ends of the first belt ply B1 outwardly toward the center of the axis of the forming drum 21. In this case, the first belt ply B1 is folded at outer ends of the second belt ply B2. The central portion of the first belt ply B1 between the positions to be folded has been embraced by the second belt ply B2 and the forming drum 21 from both sides, so that the folding of the first belt ply B1 is effected exactly at the set positions. Then the motor 48 is again energized to rotate the screw shaft 48 to retract the folding mechanisms 42 and 43 away from the forming drum 21.

Figure 7D:
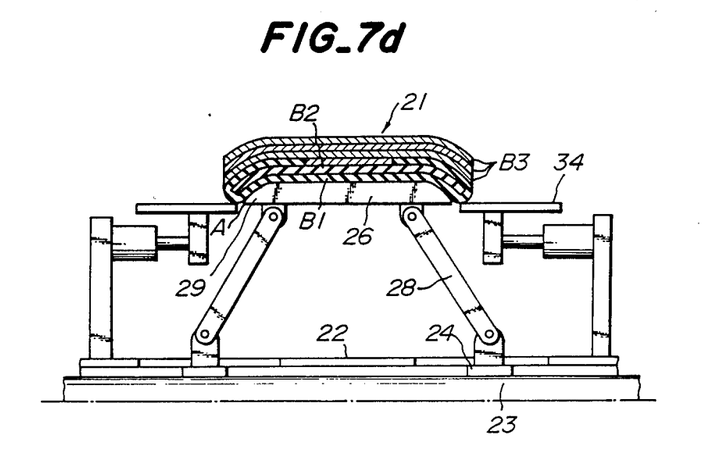

In a fourth step, while the forming drum 21 is being rotated, a third belt ply B3 is supplied to the forming drum 21 to attach the third belt ply 33 in plural layers to the first and second belt plies B1 and B2 radially outward thereof as shown in FIG. 7d. The third belt ply B3 is reinforced, for example, by circumferentially extending steel cords. Because is no clearance between the forming drum 21 and the first and second belt plies B1 and B2, the third belt ply B3 can be precisely attached to the first and second belt plies B1 and B2 at a predetermined position. When the belt for a tire has been produced in this manner as above described, the screw shaft 23 is rotated to cause the forming drum 21 to contract to the minimum diameter. The belt for a tire is then removed from the forming drum 21 and transferred to a station for a next step.

Thereafter, the screw shaft 23 is again rotated to expand the forming drum 21 to the intermediate diameters as in the first step, while the piston rods 33 of the cylinders 32 are extended to return the ring members 34 to their initial positions where the ring members 34 partially overlap the drum segments 26. The above is one cycle of the one embodiment according to the invention. This cycle is then repeated to produce belts for tires one after another.

In the above embodiment, the ends of the first belt ply B1 are folded by the fingers 64 of the hands 63. With this invention, the ends of the first belt ply B1 may be folded by expansion of a bladder.

As can be seen from the above explanation, since the second belt ply is attached to the first belt ply according to the invention, no shearing forces take place between both the belts. Moreover, the first belt ply is embraced and restrained by the forming drum and the second belt ply when the first belt ply is being folded. Therefore, the first belt ply is precisely folded at set positions. Further, the first and second belt plies are supported by the forming drum from inside when the third belt ply is about to be appointed to the first and second belt plies. Accordingly, the third belt ply can also be precisely attached at a set position.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of producing tire belts comprising a first step of attaching a first belt ply to a forming drum having, at least at its axial ends, curved portions whose diameters reduce progressively toward axially outer ends of the curved portions, said first belt ply having a width wider than an axial width of the forming drum and having an overhanging portion, a second step of expanding said forming drum so that diameters of said curved portions at axially outermost ends become a predetermined diameter smaller than a maximum diameter of the forming drum in said first step to deform the nonoverhanging portion of said first belt ply so to conform to the outer surface contour of said forming drum, a third step of folding the overhanging ends of the first belt ply back over axial outer ends of a second belt ply after attaching the second belt ply to a center portion of the first belt ply outwardly thereof, and a fourth step of attaching a third belt ply in plural layers onto said first and second belt plies outwardly thereof.

2. A method as set forth in claim 1, wherein said forming drum comprises a plurality of drum segments circumferentially equally spaced and having at axially ends said curved portions and at mid portions flat portions to form a central portion of the forming drum, said drum segments movably toward and away from an axis of the forming drum, and ring members arranged adjacent to axial ends of said drum segments to form axially outer portions of said forming drum and having outer diameters substantially equal to outer intermediate diameters of the flat portions of the drum segments, said ring embers movable in axially outward directions so as not interfere with radially outward movements of the drum segments.

3. A method as set forth in claim 2, wherein said first belt ply is attached to the forming drum formed by the drum segment having intermediate diameters and said ring members to form a substantially uniform cylindrical drum in the first step.

4. A method as set forth in claim 2, wherein said drum segments are moved outwardly to expand the forming drum in the second step.

5. A method as set forth in claim 1, wherein a central portion of said first belt ply is securely held by said second belt ply and said forming drum when the ends of said first belt ply are folded in the third step.

6. A method as set forth in claim 1, wherein after the fourth step, said drum segments are moved inwardly to remove a produced belt from said forming drum.

* * * * *